US008454367B2

(12) United States Patent
Roberts

(10) Patent No.: US 8,454,367 B2
(45) Date of Patent: Jun. 4, 2013

(54) READING GAME

(75) Inventor: Delores M. Roberts, Capital Heights, MD (US)

(73) Assignee: Delores M. Roberts, Capitol Heights, MD (US)

( * ) Notice: Subject to any disclaimer, the term of this patent is extended or adjusted under 35 U.S.C. 154(b) by 0 days.

(21) Appl. No.: 12/881,125

(22) Filed: Sep. 13, 2010

(65) Prior Publication Data

US 2011/0076652 A1 Mar. 31, 2011

Related U.S. Application Data

(63) Continuation of application No. 11/708,327, filed on Feb. 21, 2007, now abandoned.

(51) Int. Cl.
*G09B 19/22* (2006.01)

(52) U.S. Cl.
USPC .......................................................... 434/129

(58) Field of Classification Search
USPC .......... 434/128, 129, 156, 167, 178; 273/242, 273/243, 272, 297, 299–302
See application file for complete search history.

(56) References Cited

U.S. PATENT DOCUMENTS

| | | | |
|---|---|---|---|
| 4,109,918 A | 8/1978 | Mele et al. | |
| 4,678,188 A | 7/1987 | Johnson | |
| 4,706,960 A | 11/1987 | Nowacki et al. | |
| 5,167,503 A | 12/1992 | Jordan | |
| 5,244,391 A | 9/1993 | Bryant | |
| 5,273,431 A | 12/1993 | Charouhas | |
| 5,332,227 A * | 7/1994 | Passero | 273/243 |
| 5,645,280 A * | 7/1997 | Zelmer | 273/256 |
| 5,876,211 A * | 3/1999 | Schmoyer et al. | 434/128 |
| 5,918,882 A | 7/1999 | Truong | |
| 6,045,128 A * | 4/2000 | Hunt | 273/236 |
| 6,234,481 B1 * | 5/2001 | Robertson | 273/243 |
| 6,270,077 B1 * | 8/2001 | Cohen | 273/273 |
| 6,308,955 B1 | 10/2001 | Slatter | |
| 6,648,648 B1 * | 11/2003 | O'Connell | 434/188 |
| 2006/0154225 A1 * | 7/2006 | Kim | 434/322 |

* cited by examiner

*Primary Examiner* — Kurt Fernstrom

(57) ABSTRACT

An apparatus and method to improve reading, particularly the reading of young children. The game objective is to score points by answering questions posed by sets of cards. The card set is determined by a spinner. This game is designed to help children to read fluently.

1 Claim, 6 Drawing Sheets

READING GAME

RELATED APPLICATIONS

This application is a continuation of U.S. patent application Ser. No. 11/708,327 filed on Feb. 21, 2007 now abandoned titled READING GAME.

GOVERNMENT RIGHTS

This invention was not made with Government support. The Government does not have any rights in this invention.

BACKGROUND OF THE INVENTION

From several decades of research from the National Institute for Literacy, U.S. Department of Education, and the National Institute of Child Health and Human Development, it has been learned that learning to read can start at home. Learning to read can start before children go to school. Children can start down the road to becoming advanced readers from birth. Early experiences with spoken and written language are a foundation and set the stage for children to become successful readers. Research of the Maryland State Assessment Test from 2003 to 2006 indicates that many schools are below 70% in reading proficiency. The groups identified were African Americans, American Indians, Hispanic, those residing on farming communities, and special education students. The Maryland State Assessment Test in 2007 indicated that there was an increase of 2% to 5%. However, students are still below reading proficiency.

U.S. Pat. No. 5,273,431 discloses a game that may include "linguistic questions."

U.S. Pat. No. 5,244,391 discloses a game that relates to illegal chemical substances.

U.S. Pat. No. 5,167,503 discloses a game that relates colors to alphanumeric characters.

What is needed is a game that helps children who have difficulty reading and non-readers, to enjoy playing a reading game, so that they will play often and learn to read sooner than they would if they did not play the game.

What is also needed is a game that young children enjoy playing so that they play often, so the non-reader or child learns to read sooner than they would if they did not play the game.

What is also needed is a board game that is an educational game designed to help early childhood and school age children build reading skills and have fun learning at the same time. What is needed is a board game that will help to teach children to read. The accumulation of points may be the result of the player or team's knowledge in spelling, parts of speech, reading comprehension, critical thinking, problem solving, and greed.

What is also needed is a board game to teach children to read, build vocabulary, develop literacy skills, and become the first player or team to accumulate a point total, such as 550 or more points. The accumulation of points may be the result of the player or team's knowledge in spelling, parts of speech, reading comprehension, critical thinking, and greed. What is needed is a board game that is designed so that teachers can incorporate the game in their reading curriculum to help build their students reading skills.

SUMMARY OF THE INVENTION

An aspect of the present invention comprises a board game (1), comprising: a game board (90); said game board (90) having a one-directional playing track (94); a spinner (110); rotatably disposed on a spinner board (112); said spinner board (112) having a category (130), said categories (130) having a greed category (230), a read category (200), a tell the story category (210), and a spelling category (220); a set of read cards (50); a set of spelling cards (60); a set of tell the story cards (70) a set of greed cards (80), whereby the spinner (110) may land on either said read category (200), said tell the story category (210), said spelling category (220), or said greed category (230), and then, based on the category (200, 210, 220, 230) a card is selected from said respective set of cards (50, 60, 70, 80), and the card is read to a player.

Another aspect is a process of a board game (1), comprising the steps of: rolling a pair of dice to determine the order of play; spinning a spinner (110) to determine what type of card should be selected; selecting a card (50, 60, 70, 80) based on where the spinner (110) lands; responding to a question posed by the card (50, 60, 70, 80); advancing a pawn (20) on along a one-directional playing track (94) disposed on a game board (90) if the player responds correctly; and placing a wink (40) over a number on the spinner board (112) when that number relating to the respective category (130) is answered.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for illustrating the general principles of the invention, since the scope of the invention is best defined by the appended claims.

Figure 2:
FIG. 2 is a pictorial view of one embodiment of the present invention showing a read pawn.
Figure 3:
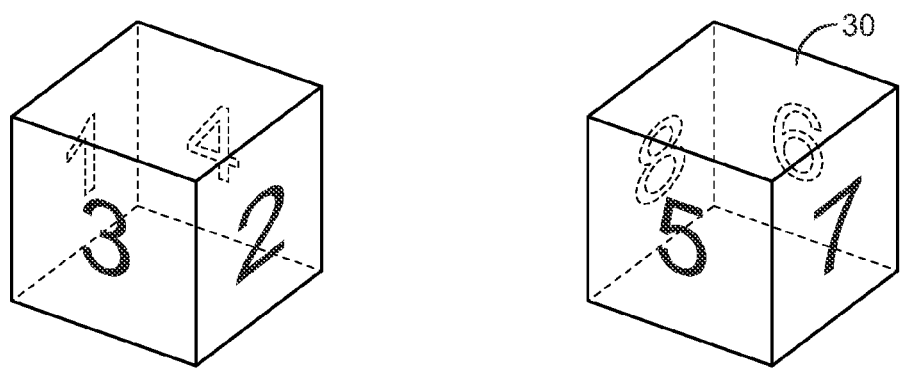
FIG. 3 is a is a pictorial view of one embodiment of the present invention showing 2 dice.
Figure 4:
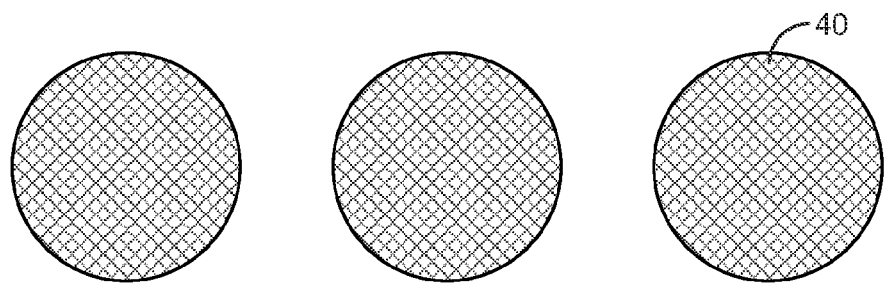
FIG. 4 is a pictorial view of one embodiment of the present invention showing a round wink.
Figure 5:
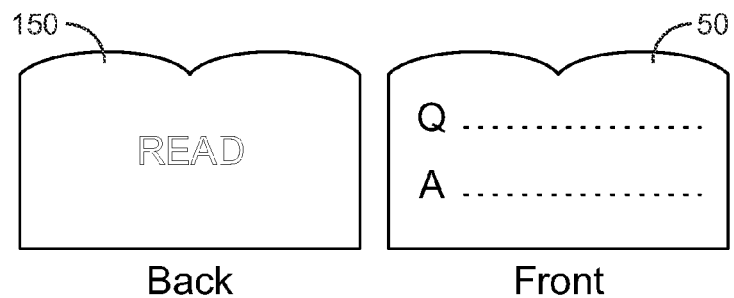
FIG. 5 is a pictorial view of one embodiment of the present invention showing a front and back view of a read card.
Figure 9:
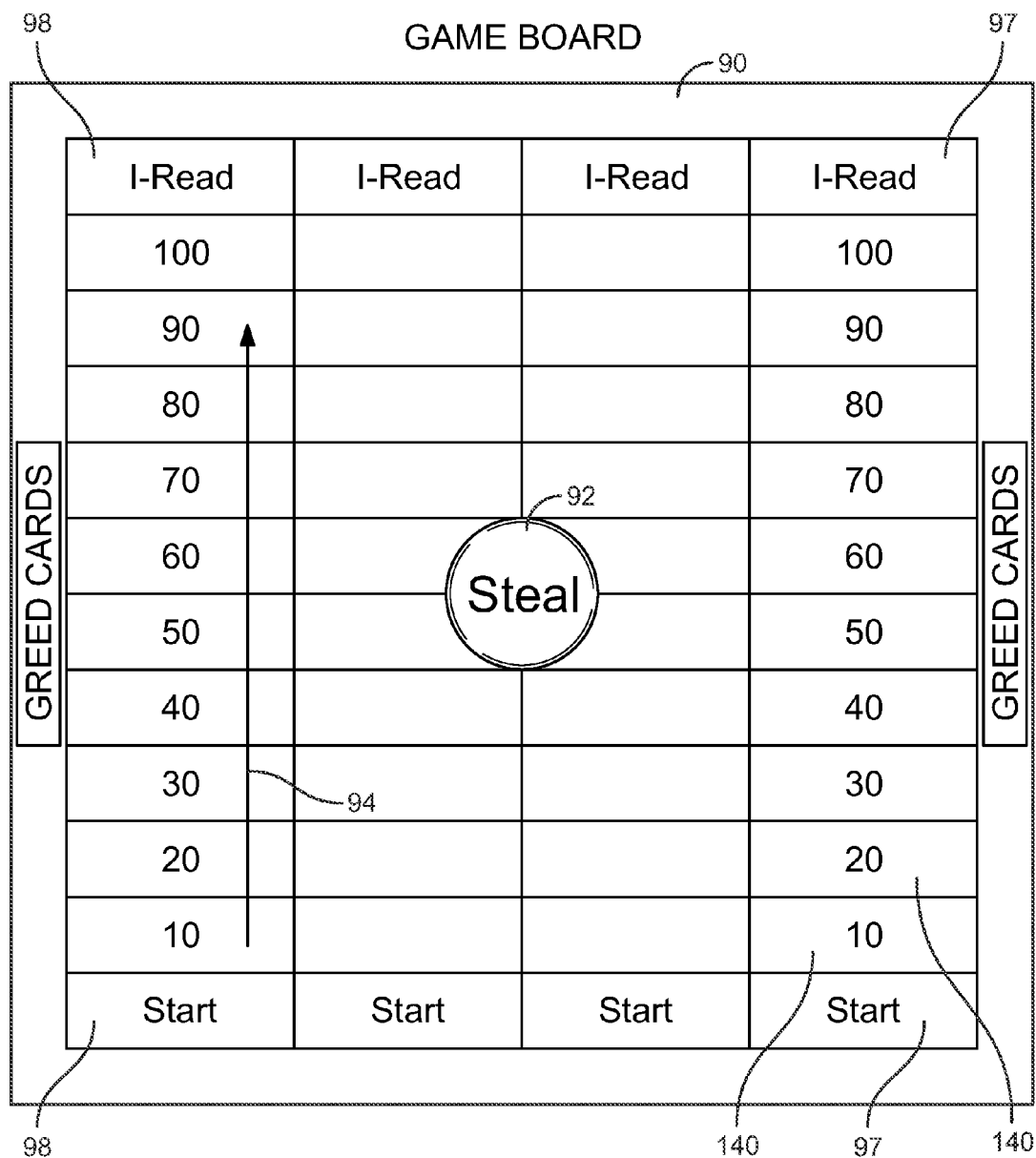
FIG. 9 is a is a pictorial view of one embodiment of a game board of the present invention showing.
Figure 10:
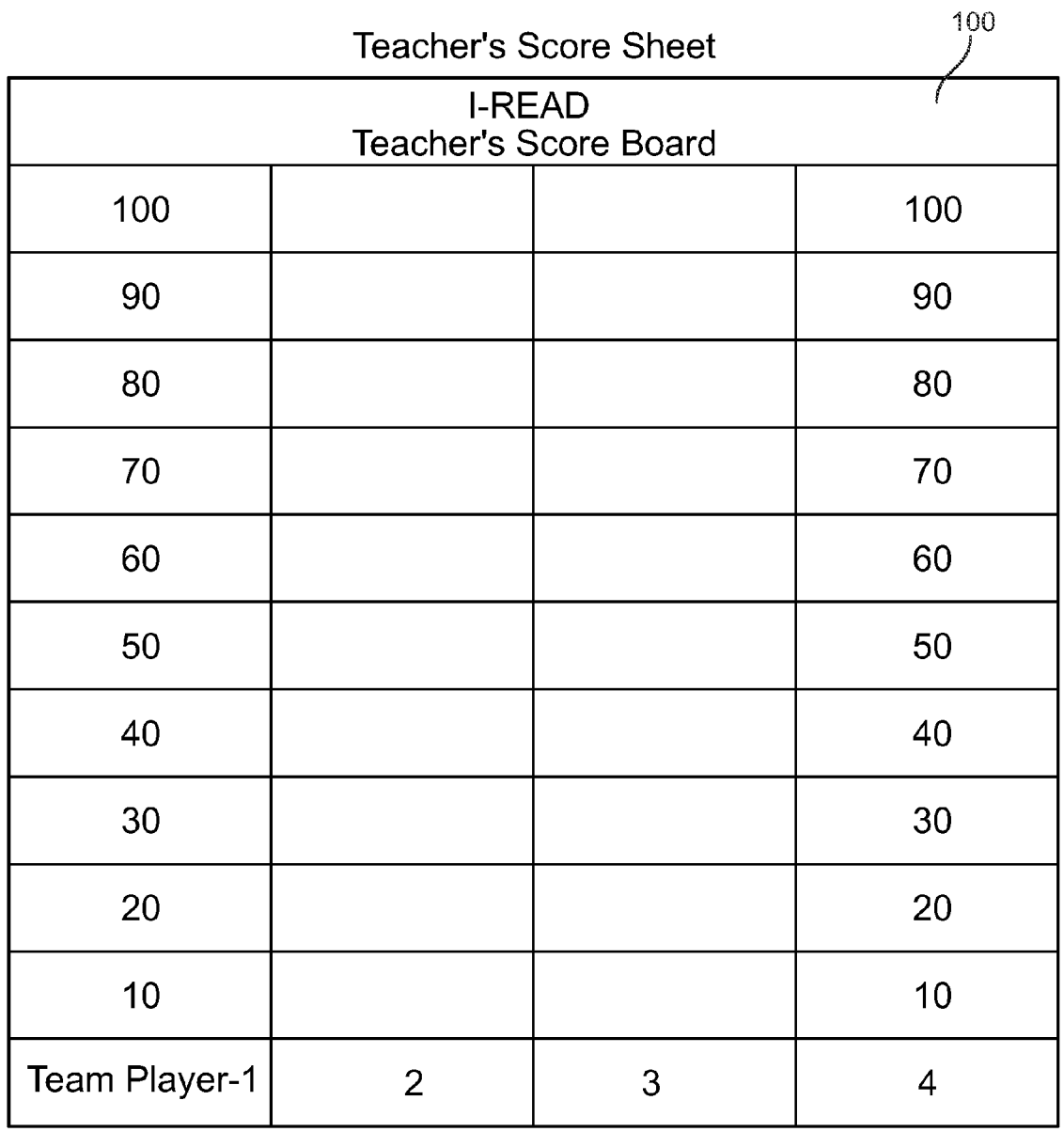
FIG. 10 is a pictorial view of one embodiment of a score sheet of the present invention.

REFERENCE NUMERALS 1 reading game
10 steal button 20 read pawn
30 die
40 wink
50 read card
60 spelling card
70 tell the story card
80 greed card
90 game board
92 steal indicia
94 one-directional playing track
96 starting point
97 point range
98 ending point
100 score sheet
110 spinner
112 spinner board
120 bonus spinner
130 number category (on spinner board 112)
140 number location (on board 90)
200 read category
210 tell the story category
220 spelling category
230 greed category As illustrated in FIG. 9, in one embodiment of the present invention reading game 1, the game board 90 may be have a one-directional playing track 94. A read pawn 20 (illustrated in FIG. 2) may be movably placed on the board 90. A team or player may move a read pawn 20 along the playing track 94 based on successfully answering a question indicated on a respective card (read card 50, spelling card 60, tell the story card 70, or greed card 80). The respective card 50, 60, 70, 80, may be chosen based on where a point of a spinner 110 of a spinner board 112 (FIG. 11) lands. The spinner 110 may rotate about an axis when pushed with a finger. In a further embodiment the spinner 110 may be rotated automatically. In a further embodiment, the board 90 may be a visual on a computer screen. In a further embodiment, the spinner 110 may be a visual on a display, and the spinner 110 may be rotated via a touch screen interface.

One goal or objective of the player or team is to become the first player or team to accumulate a point total, such as 550 or more points. The accumulation of points may be the result of the player or team's knowledge in spelling, parts of speech, reading comprehension, critical thinking, and greed To begin play, the game board 90 may be set on a table (not illustrated). The game board 90 may consist of four one-dimensional playing tracks 94. The game may be played by four teams and/or players. The game may be played by or with a teacher. The teacher may control how the game is played by the players or teams. The teacher may be referred to herein as a scorekeeper. The teacher may also keep score.

Each separate player or team may use their own spinner board 112, pawn 20, and steal button 10.

The spinner 112 may be spun to indicate what card (i.e. read card 50, spelling card 60, tell the story card 70, or greed card 80) is drawn, from which a question may be placed on one side of the card 50, 60, 70, 80. The questions may be on the fronts of the respective cards. The back of the card 50, 60, 70, 80 may have the category 150 (i.e. read, spelling, tell the story, greed) indicated. The teacher may ask the question from the card. The player or team may attempt to, and may answer the question correctly, or incorrectly. The goal is to answer the question correctly.

When the spinner 110 lands on a number category (i.e. greed category and number 50) that has already been answered, then the player or team may lose a turn. Then the next player or team may spin the spinner 110. Once a number category 130 question has been answered, then the player or team may cover the number location 140 on the board 90 with a wink 40.

Figure 12:
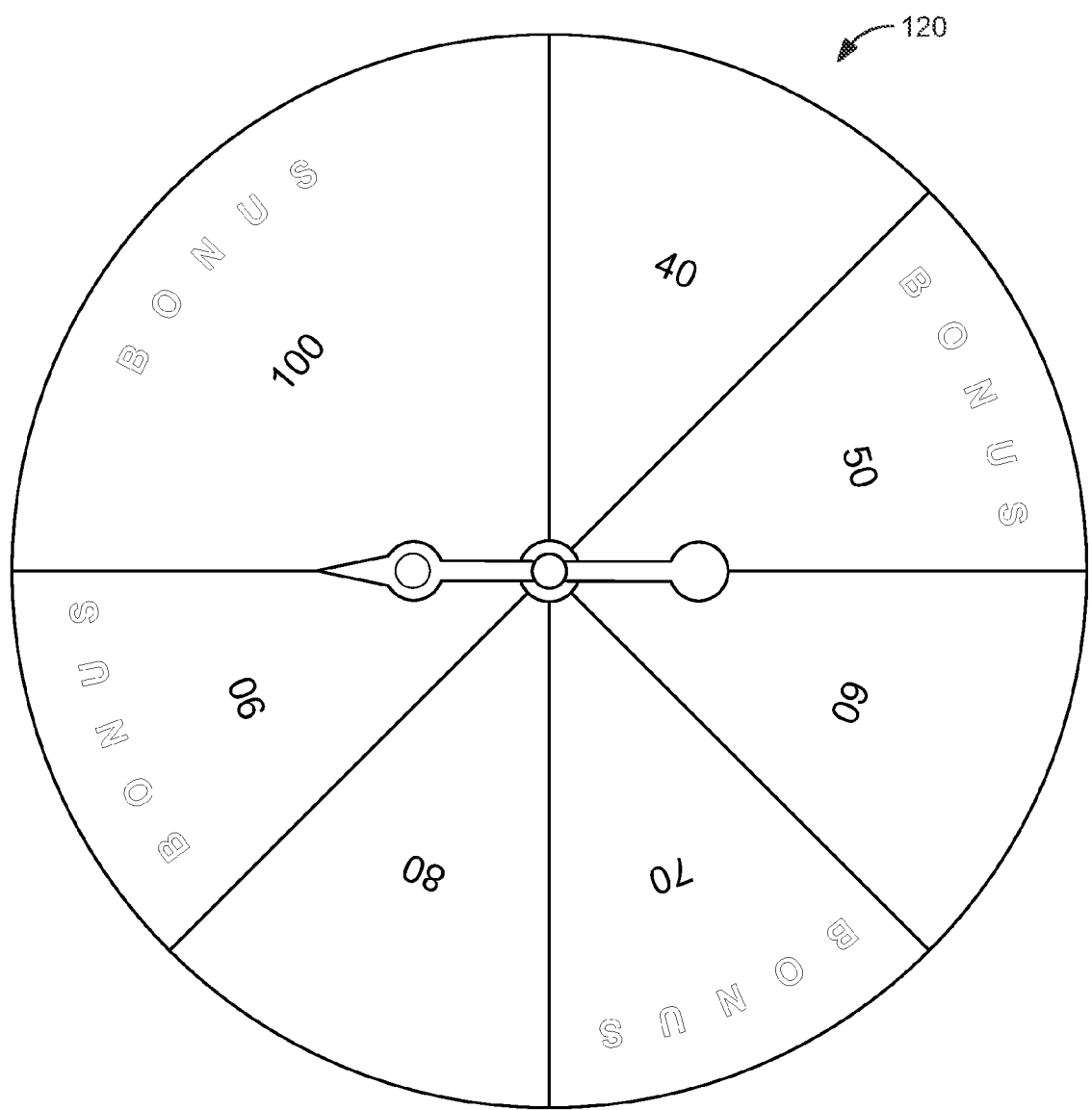
FIG. 12 is a pictorial view of one embodiment of a bonus spinner of the present invention.

Referring to FIG. 12, if, at the end of the game, there is a tie score, then a player may use the bonus spinner 120 to break the tie. Upon successfully answering the question, the player may be awarded the points indicated on the bonus spinner until the tie may be broke. At one turn, the player may spin the bonus spinner 120 twice. If a player cannot answer the question posed after spinning the bonus spinner 120, then another player may steal. This player may indicate their intent to steal by placing a steal button 20 on a steal indicia 92 on the game board 90. To steal means to answer the question posed to the player who did not correctly answer the questions. The other player who stole answers the question, then that player, the "stealer" would win the game.

When a player spins the spinner 120 and it lands on the number category 130 identified as "greed," then the greed card 80 is selected, and the player attempts to answer the question on the respective greed card 80. The questions on the greed card 80 may be more difficult than other number categories 130. Thus, the points may be higher. The game may also be structured so that if the player does not correctly answer the question, then that player may lose points and the other team/player can steal if they so choose. If not, then the game 1 continues clockwise.

Figure 1:
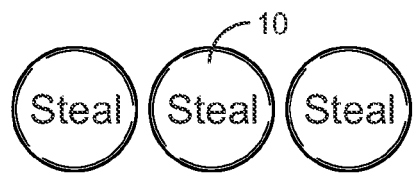
FIG. 1 is a pictorial view of one embodiment of the present invention showing three steal buttons.

FIG. 1 illustrates an embodiment of a steal button 10. The steal button 10 may be placed on the board 90, on a steal indicia 92 of the board 90. This placement of the steal button 10 may occur when a player or team of players miss a question in any category, including a bonus question. In one embodiment the steal button 10 may be made of plastic, metal, composite, or wood. The steal 10 may be a circular disk, or it may be another shape, such as square, or even a cube.

If a player ties a second time, then the teacher may select a greed card 80. The first player to answer two questions correctly wins the game. The game may be ended when the winning player or team shouts, "I read!"

The read cards 50 may help players learn the parts of speech and develop writing skills. For example, the read cards 50 may have text that displays words and/or sentences that the player reads correctly before advancing.

The spelling cards 60 may build vocabulary may help with spelling or reading. The spelling cards 60 may have the words spelled phonetically, which would require the player to recite the correct spelling. Or they may have pictures of figures, and the player would have to recite the correct spelling. In a further embodiment the spelling card 60 may have a picture and some of the letters, and the player would have to complete the word with the correct letters.

The tell the story cards 70 may build reading comprehension and develop critical thinking skills. The tell story cards 70 may have stories on them. In a further embodiment the tell story cards 70 may recite portions of well known tales or stories, and the player may have to correctly complete the tale or story correctly to advance on the board 90.

The greed cards 80 may expand the player's knowledge of all subjects in school and the world. The greed cards 80 may do this by having questions regarding demographics, science, math, technology, or other subjects.

The spinner 120 may have a diameter of 5 inches. The spinner 120 may rotate upon an axis in a circular fashion. The spinner board 112 may be divided into four number categories 130, a read category 200, a tell the story category 210, a spelling category 220, and a greed category 230. Each number category 130 may be subdivided in to point ranges, such as 10, 20 ... etc. The point range may be from 10 to 100. The greed category 230 may have two subdivided point ranges, such as 50 and 100. This allows the team to earn the respective number of points in each category.

Figure 11:
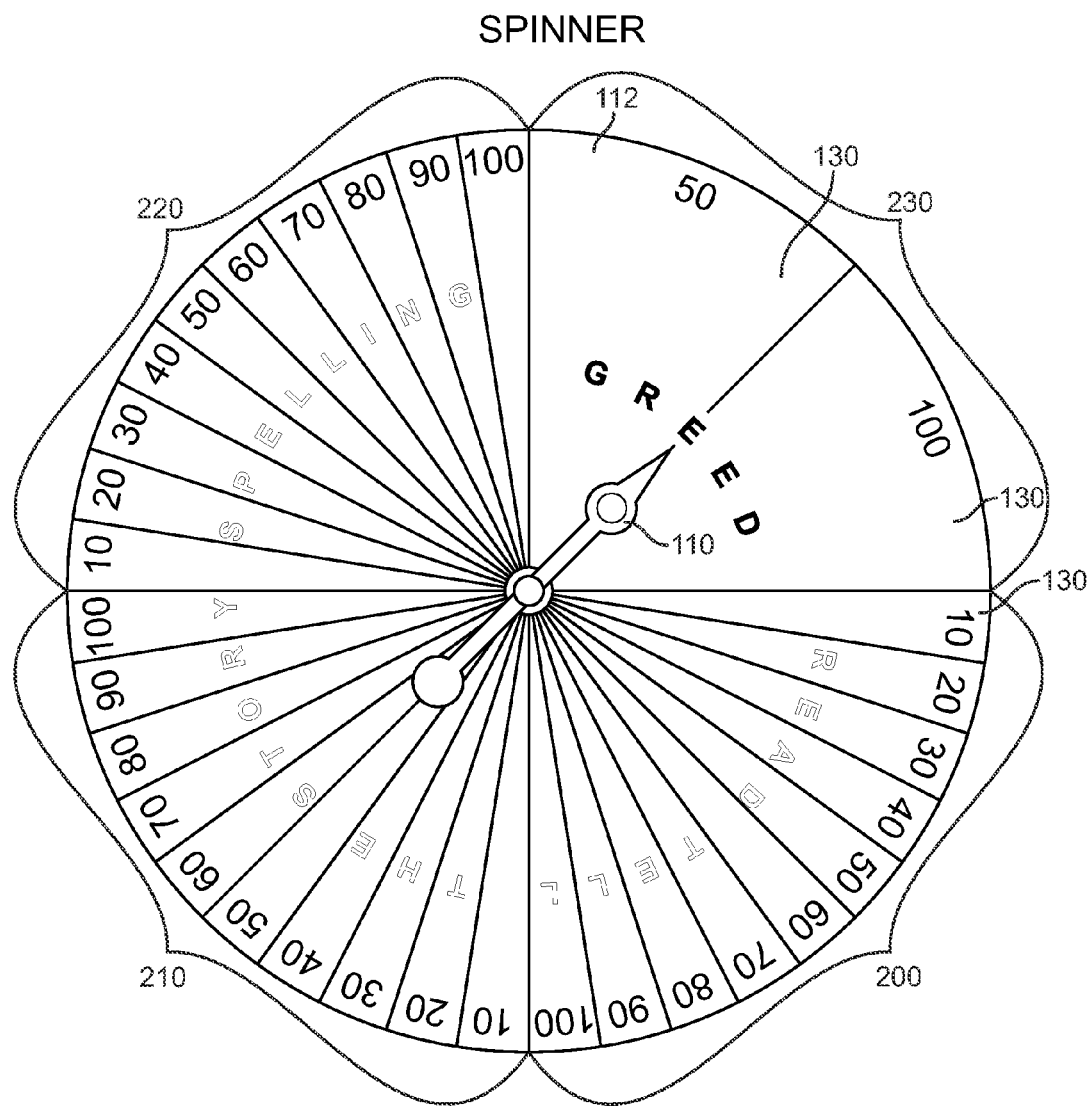
FIG. 11 is a pictorial view of one embodiment of a spinner of the present invention.

Referring to FIG. 11, the spinner board 112, when the spinner 110 lands on a tell the story region 210, the tell the story card 70 is selected and the player is to attempt to answer the question. The teacher may read the story from the tell the story card 70 while the player or team whose turn it is, listens to comprehend what is read. The teacher may then ask a question related to the story so the player can earn the points indicated on the spinner board 112. The tell the story cards 70 may be designed to help students build comprehension, critical thinking, and problem solving skills.

Figure 6:
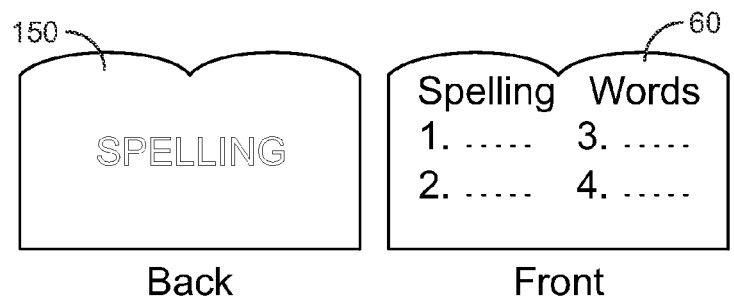
FIG. 6 is a pictorial view of one embodiment of the present invention showing a front and back view of a spelling card.
Figure 7:
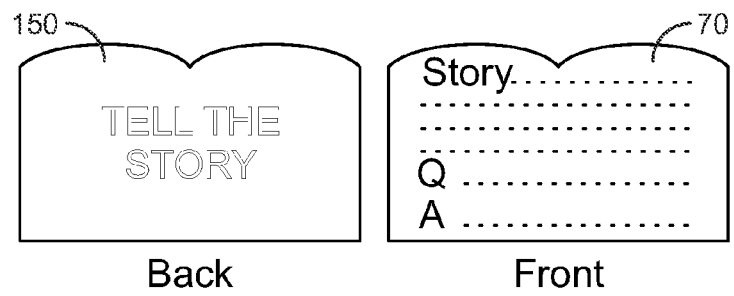
FIG. 7 is a pictorial view of one embodiment of the present invention showing a front and back view of a tell the story card.
Figure 8:
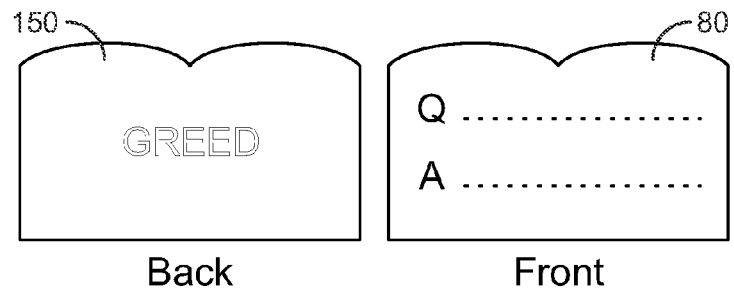
FIG. 8 is a pictorial view of one embodiment of the present invention showing a front and back view of a greed card.

Referring to FIG. 11, the spinner board 112 may have a spelling category 220. When the player spins the spinner 110, and if it lands within the spelling category 220, then a spelling card 60 may be selected. If so, the card has a word, which the player tries to spell correctly. Spelling is essential in order to read. Spelling cards 60, as seen in FIG. 6, will help students build their vocabulary and read fluently.

Referring to FIG. 11, the spinner board 112 may have a greed category 230. If a player lands on the greed category 230, then a greed card 80 is selected. The greed cards 80 may ask questions that are more difficult, and the points in the subdivided point sections may be worth more than the other categories 130. This category 130, the greed category 230 may create excitement among students that are more knowledgeable in school and world subject matter, thus building positive self-esteem as well as self-confidence to meet academic challenges.

Referring to FIG. 11, when the spinner 110 lands on the read category 200, a read card 50 is selected. The read card 50 may have a question on reading concepts necessary to help students build their reading and writing skills.

As illustrated in FIG. 9, the game board 90 may have four one-directional playing tracks 94 with a starting point 96, a running point range 97, and an ending or finishing point 98. There may be four (4) one-directional playing tracks 94.

All cards 50, 60, 70, 80 may have questions and answers on the respective card 50, 60, 70, 80. The cards 50, 60, 70, 80 may have questions at the top and answers at the bottom.

The read cards 50, spelling cards 60, and tell the story cards 70, may be placed facedown not on the game board 90. The greed cards 80 may be placed face down on the game board 90.

Dice 30 may be used to determine who goes first, second, etc. . . . For

I claim:
1. A method of playing a board game (1), comprising:
Providing a game board (90); said game board (90) having a one-directional playing track (94);
a read pawn (20) is placed on said board 90, by each team or a player; said player or said team move a read pawn (20) along said one-directional playing track (94) based on successfully answering a question indicated on at least one of either a read card (50), a spelling card (60), a tell the story card (70), or a greed card (80); said respective card (50), (60), (70), (80), is chosen based on where a point of a spinner (110) of a spinner board (112) lands;
said spinner rotates about an axis when pushed with a finger;
whereby a player with the most predetermined points wins and points are awarded by correctly answering questions on said respective card (50), (60), (70), (80);
once the number category (200), (210), (220, (230) question has been answered, then the player or team covers the number location on said board (90) with a wink (40)
if the spinner lands on a number category that has already been answered, the player or team loses a turn and cannot draw a card; and the next player spins the spinner (110);
if, at the end of the game, there is a tie score, then a player uses the bonus spinner (120) to break the tie by upon successfully answering the question, the player is awarded the points indicated on the bonus spinner until the tie may be broke;
at one turn, the player spins the bonus spinner (120) twice; and
if a player cannot answer the question posed after spinning the bonus spinner (120), then another player may steal: this other player indicates their intent to steal by placing a steal button (20) on a steal indicia (92) on the game board (90); to steal means to answer the question posed to the player who did not correctly answer the question; then the other player who stole answers the question, then that player, the "stealer" would win the game.

* * * * *